Nov. 9, 1965 G. W. SHERWOOD 3,217,156
EMERGENCY LIGHTING SYSTEM
Filed Feb. 11, 1963

INVENTOR.
GEORGE W. SHERWOOD
BY
ATTORNEYS.

3,217,156
EMERGENCY LIGHTING SYSTEM
George W. Sherwood, 1347 Audubon,
Grosse Pointe Park 30, Mich.
Filed Feb. 11, 1963, Ser. No. 257,501
9 Claims. (Cl. 240—10.6)

The invention relates to emergency lighting systems and refers more specifically to apparatus including a flashlight having rechargeable batteries and means for supporting the flashlight, charging the batteries and causing the flashlight to light on interruption of electric energy supplied thereto.

Emergency lighting systems which are energized on the failure of a general lighting system have been widely used in hospitals, public buildings, airplanes and the like. Prior emergency lighting systems have, however, usually been relatively complicated and therefore expensive. In addition emergency lighting systems have generally been stationary in the past and have often provided insufficient light in some areas of a structure to be lighted. Also with prior known emergency lighting systems constant and often expensive maintenance has been required to insure their operation when needed.

It is therefore one of the objects of the present invention to provide an improved emergency lighting system.

Another object is to provide an emergency lighting system including a portable light.

Another object is to provide an emergency lighting system wherein the emergency light is a flashlight.

Another object is to provide an emergency lighting system as set forth above wherein means are provided for maintaining the flashlight batteries in maximum charged condition.

Another object is to provide an emergency lighting system which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 3 is a schematic diagram of the electrical circuit for the emergency lighting system illustrated in FIGURES 1 and 2.

Figure 1:
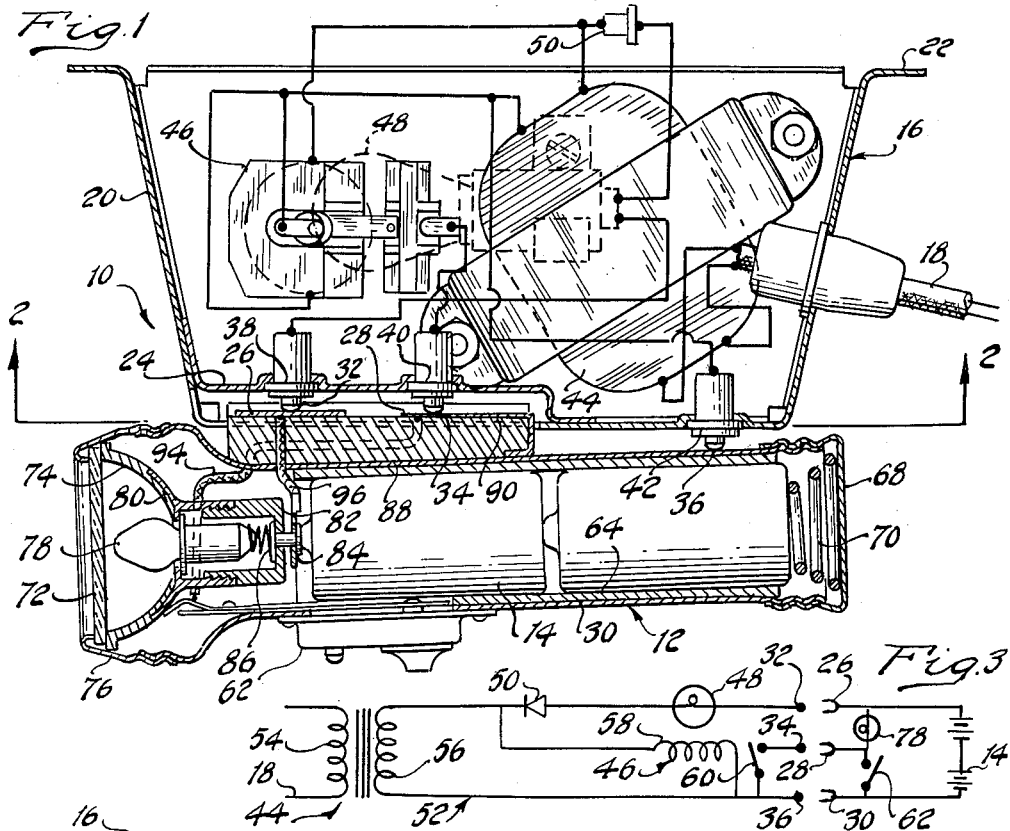
FIGURE 1 is a longitudinal section view of an emergency lighting system constructed in accordance with the invention and taken substantially on the line 1—1 in FIGURE 2.

With particular reference to the figures of the drawing one embodiment of the present invention will now be considered in detail.

As shown best in FIGURE 1 the emergency lighting system 10 of the invention comprises a flashlight 12 with rechargeable batteries 14 and a combination flashlight supporting, charging and actuating structure 16. In use the flashlight 12 is supported from the combination supporting, charging and actuating structure 16 with the rechargeable batteries 14 in a fully charged condition when electric energy is fed to the combination supporting, charging and actuating structure 16 over conductors 18. On interruption of electric energy to the supporting, charging and actuating structure 16 over conductors 18 the flashlight is actuated to provide emergency lighting until energy can be restored to the conductors 18.

More specifically the combination supporting, charging and actuating structure 16 includes case 20 adapted to be secured to a fixed support in a structure wherein emergency lighting is to be provided by means of the flange 22. The case 20 includes the depressed generally triangular portion 24, best shown in FIGURES 1 and 2 forming a wedge-shaped recess 25 having flanges 27 and 29 along the sides thereof in the case 20. Contact members 32, 34 and 36 are resiliently mounted in resilient insulating mounting means 38, 40 and 42 in the combination supporting, charging and actuating structure 16.

Figure 2:
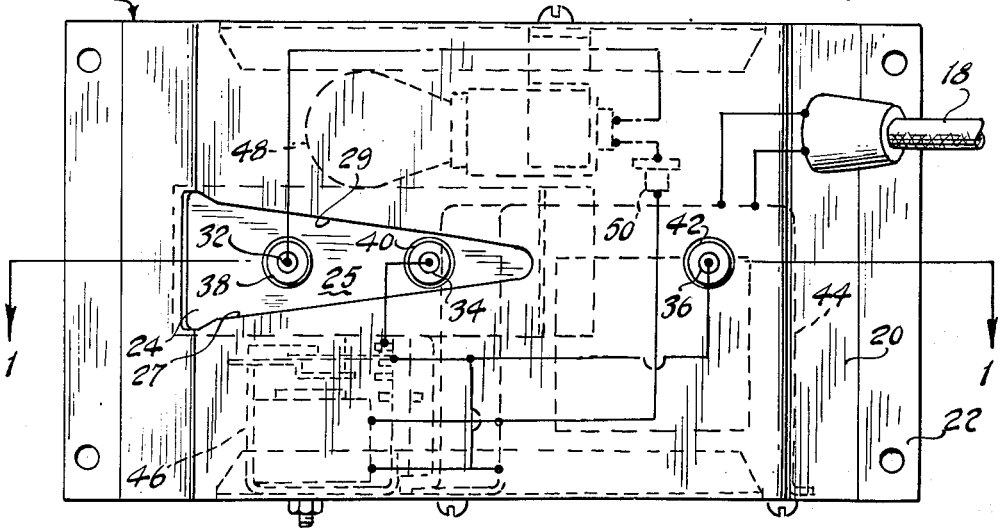
FIGURE 2 is a plan view of the flashlight supporting, charging and actuating apparatus of the emergency lighting system illustrated in FIGURE 1 taken substantially on the line 2—2 in FIGURE 1.

The transformer 44, solenoid operated switch 46, light 48 and crystal rectifier 50 are supported in the case 20, as shown best in FIGURES 1 and 2. The electrical connections between the transformer 44, solenoid actuated switch 46, light 48 and rectifier 50 is as shown in FIGURE 3.

In operation with electrical energy fed to the combination supporting, charging and actuating structure over conductors 18, the transformer 44 having the primary and secondary windings 54 and 56 respectively is energized to energize the solenoid 58 of the solenoid actuated switch 46 to cause the switch portion 60 thereof to be opened so that no electric circuit can be completed through contact member 34. At the same time the alternating electric signal from the secondary winding 56 of transformer 44 is rectified through rectifier 50 and is passed through signal limiting lamp 48 of the supporting, charging and actuating structure. A direct electric signal is therefore felt across contact members 32 and 36 which is used to charge batteries 14 of flashlight 12 as will be considered subsequently.

Should the electrical energy be removed from transformer 44 due to a failure of the supply of electric energy to conductor 18, the solenoid 58 will become de-energized and switch 60 which is spring urged toward a closed position will be closed. With switch 60 closed and the flashlight 12 positioned as shown in FIGURE 1 on the supporting, charging and actuating structure 16, the on-off switch 62 of the flashlight 12 will be shorted out to cause the flashlight to light.

Flashlight 12 includes the conductive case 30 surrounding the insulating sleeve 64 in which the rechargeable batteries 14 are positioned in series circuit. The circuit from the conductive case 30 through the batteries 14 is completed at one end through the conductive cover 68 and spring 70. At the other end of the flashlight the lens 72 and reflecting member 74 are held in place by the threaded annular member 76. Lamp 78 is secured in the flashlight 12 by means of the annular member 80 connected to the reflecting member 74 and the threaded cup 82 having the pivot member 84 and spring 86 secured therein, as shown best in FIGURE 1.

Pivot member 84 and spring 86 permit rotation of the flashlight lamp 78 with respect to the conductor 96 and contact member 26. Assembly of the bulb 78 within flashlight 12 is thus facilitated.

A triangular or wedge-shaped insulating member 88 having an overhanging flange 90 at each side thereof is secured to the flashlight by convenient means. The member 88 is constructed to fit within the recess 25 provided in the supporting case 20 so that the flashlight is supported therefrom by means of the flanges 90 abutting against the flanges 27 and 29 of the case 20. Electric conductors 94 and 96 extend between the contact members 28 and 26 on the member 88 and the flashlight on-off switch 62 and pivotal member 84 respectively as shown best in FIGURE 1 to complete the flashlight circuit shown at the right in FIGURE 3.

In over-all operation the combination supporting, charging and actuating structure 16 is supported for example from a wall of a structure (not shown) in which emergency lighting is required and the conductors 18 are connected into the electrical circuit for the usual lighting system for the structure so that transformer 44 is energized as long as electric energy is supplied to the usual lighting system but will be deenergized on failure of the usual energy supply to the usual lighting system. With the transformer 44 energized the switch 60 of the solenoid operated switch 46 is opened and a direct current battery charging signal is provided between contact members 32 and 36. The electric potential between the contact members 32 and 36 will be sufficient to maintain the flashlight batteries 14 at a maximum charge without injury to the batteries or use of excessive power on proper selection of the lamp 48.

The flashlight 12 is secured to the combination flashlight supporting, charging and actuating structure 16 with the member 88 fitting within the recess 25 provided in the flashlight case 20 of the supporting, charging and actuating structure 16 with the flanges 27 and 29 overlying the flanges 90 of member 88 and the contact members 26 and 32, 34 and 28 and the contact member 36 and flashlight case 30 in engagement as shown best in FIGURE 1.

A direct electric signal is thereby provided through contact members 32 and 36 for charging the flashlight batteries 14. Further in accordance with the invention the solenoid 58 of the solenoid operated switch 46 will be deenergized should the usual electric circuit for the lighting system be broken whereby the switch 60 of the solenoid actuated switch 46 will return to its normally closed position so that the flashlight operating switch 62 will be bypassed by a closed circuit through contact members 34 and 28 and contact member 36 and flashlight case 30 whereby the flashlight bulb 78 will be illuminated by the batteries 14 to provide an emergency light.

Thus it will be seen that an extremely simple, economical and efficient emergency lighting system 10 has been provided wherein on failure of the electric signal in the usual lighting system the flashlight 12 will be actuated to produce an emergency light. In addition it will be noted that very low maintenance is required of the emergency lighting system 10 since the batteries are maintained in a constant state of maximum charge. Further maintenance only requires cutting off of the electric signal to the conductors 18 or removal of the flashlight 12 from the combination supporting, charging and actuating structure 16 and checking thereof in the usual manner. In addition the emergency lighting system 10 disclosed has the advantage that on failure of the usual lighting system the flashlight not only is actuated to provide an emergency light but is readily removable from the combination supporting, charging and actuating structure 16 so that a portable emergency light is provided.

While one embodiment of the invention has been disclosed in detail it will be understood that other embodiments thereof are contemplated. It is the intention to include all embodiments and modifications of the invention disclosed that are defined by the appended claims within the scope of the invention.

What I claim as my invention is:

1. An emergency lighting system for use on failure of a source of electric energy for a usual lighting system comprising a flashlight including a rechargeable battery and a combination flashlight supporting, charging and actuating structure operably associated with the flashlight for supporting the flashlight in a desired location, charging the rechargeable flashlight battery and actuating the flashlight on failure of the source of electric energy for the usual lighting system, including an outer conductive case having a flanged, wedge-shaped recess in one surface thereof, three insulated resiliently mounted contact members secured to the case, at least one of which is positioned within the wedge-shaped recess and at least one of which is positioned adjacent the wedge-shaped recess, a transformer including primary and secondary windings, electric conductors connecting the primary winding of the transformer to a source of electric energy, a signal limiting device in series between one side of the transformer secondary winding and one of the specifically positioned contacts, and means connecting the other side of the secondary winding of the transformer to the other of the specifically positioned contacts.

2. An emergency lighting system for use on failure of a source of electric energy for a usual lighting system comprising a flashlight including a rechargeable battery and a combination flashlight supporting, charging and actuating structure operably associated with the flashlight for supporting the flashlight in a desired location, charging the rechargeable flashlight battery and actuating the flashlight on failure of the source of electric energy for the usual lighting system, including an outer conductive case having a flanged, wedge-shaped recess in one surface thereof, a pair of insulated resiliently mounted contact members secured to the case within the wedge-shaped recess, a third resiliently mounted insulated contact member secured to the case adjacent the wedge-shaped recess, a transformer including primary and secondary windings, electric conductors connecting the primary winding of the transformer to a source of electric energy, a signal limiting device in series between one side of the transformer secondary winding and one of the contact members within the recess, and means connecting the other side of the secondary winding of the transformer to the contact member adjacent the recess.

3. Structure as set forth in claim 2 wherein the flashlight comprises a tubular outer case of conducting material, said rechargeable battery being within the outer case and insulated therefrom, a flashlight lamp, means for connecting one terminal of the rechargeable battery to the flashlight case, means for connecting the other terminal of the rechargeable battery to one terminal of the flashlight lamp and a switch for connecting the other terminal of the flashlight lamp to the flashlight case and a pair of contact members connected between the other terminal of the flashlight battery and the one terminal of the flashlight lamp and to the other terminal of the flashlight lamp respectively.

4. Structure as set forth in claim 3 wherein the contact members are secured to a flanged wedge-shaped insulated member which is secured to the flashlight case for supporting the flashlight in the combination supporting, charging and actuating structure.

5. Structure as set forth in claim 3 wherein the connection provided between the contact member connected between the other terminal of the battery and the one terminal of the flashlight lamp and the battery and lamp includes means for permitting rotation of the flashlight lamp with respect to the contact member connected between the other terminal of the battery and the one terminal of the flashlight lamp.

6. Structure as set forth in claim 2 and further including a relay actuated switch including a solenoid connected across the secondary winding of the transformer and a switch responsive thereto connected between the other contact member in the recess and the contact member exterior of the recess.

7. Structure as set forth in claim 2 wherein the signal limiting device is a lamp.

8. Structure as set forth in claim 2 and further including uni-directional current limiting means positioned between the one side of the secondary winding of the transformer and the one contact member in the recess in series with the signal limiting device.

9. An emergency lighting system for use when electric electric energy is cut off from a usual lighting system including a flashlight having in series rechargeable batteries, a flashlight on-off switch and a flashlight lamp and first, second and third electric contact members connected between the rechargeable batteries and flashlight lamp, between the switch and batteries and between the flashlight lamp and switch respectively and a combination flashlight supporting, battery charging and flashlight actuating structure including a transformer having a primary and secondary winding, a rectifier, an electric signal limiting device and a fourth contact member in series with one side of the secondary winding of the transformer, a fifth contact member in series with the other side of the secondary winding of the transformer, a switch actuating solenoid connected across the transformer secondary winding and a switch responsive to said solenoid connected between said fifth contact member and a sixth contact member, means for energizing the transformer when the usual lighting system is supplied with electrical energy and means for mounting the flashlight on the combination flashlight supporting, charging and actuating structure with the fourth contact member in contact with the first contact member, the fifth contact member in contact with the second contact member and with the sixth contact member in contact with the third contact member.

References Cited by the Examiner

UNITED STATES PATENTS

| | | | |
|---|---|---|---|
| 1,922,079 | 8/33 | Dixon | 240—37.1 X |
| 2,293,284 | 8/42 | Emanuel. | |
| 2,389,762 | 11/45 | Burke | 240—37.1 X |
| 2,410,527 | 1/46 | Schinske | 320—2 |
| 2,668,228 | 2/54 | Levinson et al. | 240—1 |
| 2,863,038 | 12/58 | Lombardo | 240—37.1 |

FOREIGN PATENTS

| | | |
|---|---|---|
| 229,736 | 2/44 | Switzerland. |
| 245,216 | 7/47 | Switzerland. |

NORTON ANSCHER, *Primary Examiner.*